Aug. 9, 1966 K. GÜRS 3,265,989
LASER APPARATUS USING HIGH FREQUENCY ELECTRODELESS
DISCHARGE PUMPING
Filed April 13, 1962
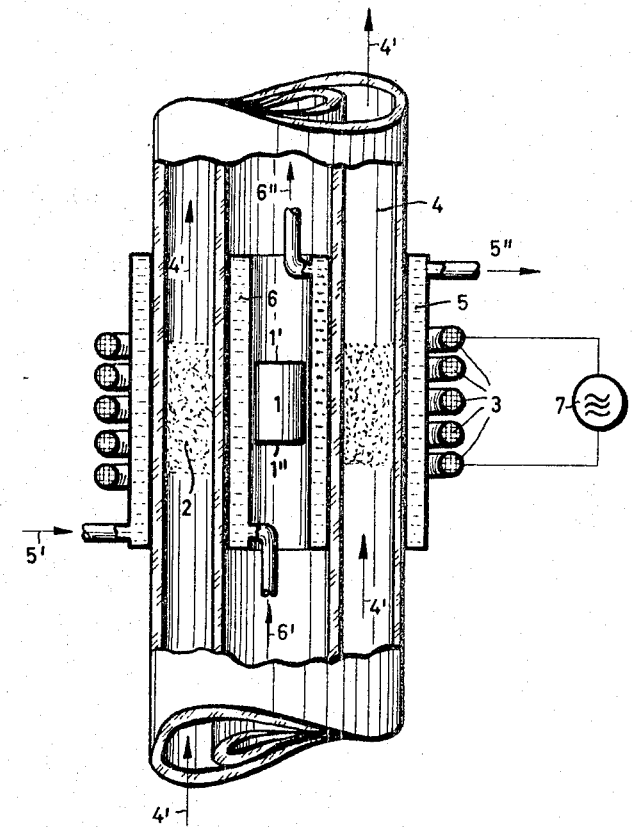

United States Patent Office 3,265,989
Patented August 9, 1966

3,265,989
LASER APPARATUS USING HIGH FREQUENCY ELECTRODELESS DISCHARGE PUMPING
Karl Gürs, Munich, Germany, assignor to Siemens & Halske Aktiengesellschaft, Munich, Germany, a corporation of Germany
Filed Apr. 13, 1962, Ser. No. 187,318
Claims priority, application Germany, May 16, 1961, S 73,981
9 Claims. (Cl. 331—94.5)

My invention relates to light amplification by stimulated emission of radiation, in devices known as masers.

Methods are well known by which inversion in ion population on the energy levels of an optical maser, for example a ruby laser, is achieved by intermittent pulsewise operation, the laser crystal being disposed on the axis of a tubular glass helix. A capacitor battery is instantaneously discharged through the glass tube, thus igniting a gas discharge. The discharge is rapidly extinguished, to be reignited after lapse of a pulse interval. The radiation issuing from the gas discharge causes the required change in the occupation of the energy levels within the laser crystal needed to stimulate generation of light in the crystal. Such pulse-operated intermittent "optical pumping" is often undesirable. The need for a suitable and sufficiently intensive energy source for continuous optical pumping, to produce continuous irradiation of the laser material, has heretofore not been met satisfactorily.

The principal object of the present invention is to provide a new and improved laser apparatus.

I have found that reliable and continuous optical pumping of a laser, and consequently reliable and continuous light output from the laser, can be obtained by subjecting the active laser material, such as a ruby crystal, to radiation from the plasma of an electric gas discharge that surrounds the laser, which discharge is continuously maintained without use of electrodes, as by inducing in the plasma a flow of current circulating about the laser axis. An inductively produced annular shaped plasma discharge is employed.

A ring zone in argon gas highly heated by plasma eddy currents is produced inductively by a coil energized by high-frequency current. The ion density in argon sufficient for this purpose is obtained by providing a carbon rod centrally in an argon-containing vessel. The carbon rod is first heated by a high-frequency coil to a high temperature, thus thermally producing the necessary ion density in argon which suffices to thereafter ignite the argon, and to further heat it up to the desired plasma temperature. In this manner, plasma temperatures up to 5000° C. can be produced. A ring-shaped gas discharge can be produced in a tubular vessel filled with the protective gas by a high-frequency induction coil surrounding the tube, without the aid of any heating-up means. This can be done by first keeping the gas pressure in the vessel low, whereby the gas discharge is ignited. Reduction of the protective gas pressure down to about 1/10 to 10 mm. Hg suffices. At low pressures, for example 3/4 mm. Hg (Torr), the mean paths become larger by several powers of 10 (1000 times) than at normal pressure, so that the ionized corpuscles that are always present in the protective gas can, under the effect of the high-frequency field, attain an energy sufficient for further collision ionization. At these low pressures there will then occur a further ignition up to the desired plasma discharge, the intensity of the alternating field being increased until the plasma discharge commences at these low pressures. After ignition of this plasma discharge, one increases the pressure of the protective gas to the normal pressure (about 1 atm.) or to still higher pressures, namely until the desired temperature is reached. For this purpose, the voltage across the high-frequency coil, and thus the power supplied, are increased accordingly.

Initially, the annulus is filled with argon gas at low pressure, for example only about 1/10 to 10 Torr (mm. Hg). The high-frequency coil is connected to a high-frequency generator through a regulating transformer whose secondary voltage is adjustable. When the circuit is closed, the induction coil is traversed by high-frequency current which produces a magnetic field in the annulus. At the mentioned low pressures of the argon and with a sufficiently high magnetic excitation, the argon is caused to ignite because several free mean paths in argon are sufficient in order to impart to the saturated corpuscles located in the gas an energy enough for further impact ionization. By increasing the current in the high-frequency coil the plasma discharge is thereafter commenced in the argon gas and is increased up to the desired temperature. The plasma discharge can be extinguished by rapidly pumping the argon out of the annular tube. In lieu thereof, another gas, for example hydrogen or other gases together with hydrogen, may be pumped into the tube whereby likewise the argon discharge is extinguished.

However, it is not essential that the ignition of the plasma discharge be effected by lowering the gas pressure, and that only thereafter the pressure of the gas be increased to the operating pressure, with simultaneous increase of the temperature in the plasma discharge. The ignition of the plasma discharge may be effected in various other ways. For example, the discharge can be initiated without pressure reduction by ionizing the gas with the aid of point or tip discharges or the like, at relatively low pressures of the order of magnitude of 10 mm. Hg or more. The plasma discharge is then ignited under the effect of the induction coil surrounding the gas. Tests have shown that the point discharge which initiates the plasma discharge can take place outside of the gas discharge space.

Further details of the invention will be understood from the embodiment illustrated in the drawing and described presently.

In the illustration a laser crystal, consisting for example of ruby, is denoted by 1. However, other crystals can be used instead, for example semiconductor monocrystals of silicon, germanium or the known $A^{III}B^V$ compounds.

Reference is made to Electronics, October 27, 1961, page 39 and following, and the series of articles beginning on that page, for common details of laser devices.

The laser crystal 1 is so designed in known manner as to serve as a light amplifier. For this purpose, for example, the two planar and parallel end faces 1' and 1'' are coated with a thin reflective metal layer which is permeable to light at least at one of these faces. The performance and operation of such light amplifier is known.

In the illustrated example, the laser is surrounded by a ring-shaped or annular gas discharge 2 whose radiation effects the change in population of the energy levels within the laser monocrystal 1, as required for light amplification. The crystal 1 is preferably arranged on the axis of the annular plasma discharge 2 as shown. Induction coil 3 produces and maintains the ring-shaped gas discharge. The coil, shown in cross section, is energized by a high-frequtncy generator 7, with alternating current having a frequency of about 4000 kilocycles (=4 mc.). To ignite the plasma discharge 2, the pressure of the gas can first be kept so low that the glow discharge becomes ignited without use of auxiliary devices, that is, merely by the effect of the high-frequency current flowing in the coil 3. Thereafter, the pressure is slowly increased, with a simultaneous increase of the temperature in the gas discharge, until the plasma discharge commences.

In lieu thereof, the ignition and starting of the plasma discharge can also be effected without previous pressure reduction in the gas, by employing pressures of a few mm. Hg, and ionizing the gas, for example by electric discharges from point electrodes (not shown) or the like in known manner.

The gas is contained in an annular vessel 4 which surrounds the monocrystal 1 and has a ring-shaped cross section. The crystal 1 is located in the inner space of the annulus, which is surrounded externally by the induction coil. In lieu of using a body of stationary gas, the gas employed in the illustrated embodiment flows in the longitudinal direction through the ring-shaped vessel, as indicated by arrows 4'. The gas is preferably a noble or inert gas, particularly argon. As the gas approaches the already formed plasma discharge, the gas is first heated and then participates in the plasma discharge as it passes through the strong field of the coil 3, whereafter the gas leaves this discharge. Due to this continuous flow of the gas through the region of the plasma discharge 2, the plasma discharge 2 can be kept constant in a simple manner. However, the discharge can also be operated in a stationary gas.

The wall of the vessel 4 is formed of a glass permeable to the laser pumping radiation, preferably quartz, the wall being cooled in the vicinity of the plasma discharge 2 for protection against the high temperature at this location. For this purpose, the annular vessel 4 is surrounded inside and outside by respective jackets 5 and 6 traversed by cooling liquid entering and leaving through nipples 5', 5" and 6', 6" respectively. The cooling jacket 6 as well as the coolant fluid or liquid are transparent, i.e. permeable, to the laser radiation.

Laser radiation takes place preferentially in the axial direction. Laser pumping radiation is either identical with the plasma radiation or constitutes a portion thereof, and occurs radially. Consequently, the cooling liquid and the wall of the vessel should be permeable to the light radiation of the plasma discharge.

High plasma temperatures are attained, of several thousand degrees. The cooling is necessary to prevent the crystal from being heated to an excessively high temperature.

The coolant may be vapor derived by evaporating a liquid in the jackets, such as liquid nitrogen.

It will be obvious to those skilled in the art, upon a study of this disclosure, that my invention permits of many modifications with respect to equipment and materials used, and hence can be given embodiments other than that illustrated and described above, without departing from the essential features of my invention, and within the scope of the claims annexed hereto.

I claim:

1. An apparatus for continuous light amplification, comprising a housing having inner and outer walls forming an outer annular chamber therebetween and an inner chamber within the inner wall, a lasar crystal within the inner chamber, means for flowing a gas continuously through the outer annular chamber, a high-frequency coil for continuously inducing an electric current in the gas to continuously form an electrodeless plasma discharge therein, so as to continuously expose the crystal to optical pumping action by radiation from the plasma of the discharge, and means interposing a coolant between the crystal and the plasma.

2. Apparatus as claimed in claim 1, wherein said means interposing a coolant comprises a quartz jacket through which a coolant flows, said coolant being transparent to the radiation from the plasma discharge and from the peripheral surface of the crystal, the walls of the housing being also of quartz.

3. An apparatus for continuous light amplification, comprising a laser crystal, a housing having inner and outer walls forming an outer annular gas chamber for holding gas therebetween and an inner chamber within the inner wall, a laser crystal within the inner chamber, a high-frequency coil for continuously inducing an electric current in the gas to continuously form an electrodeless plasma discharge therein, so as to continuously expose the crystal to optical pumping action by radiation from the plasma of the discharge, and means interposing a coolant between the crystal and the plasma.

4. Apparatus as claimed in claim 1, wherein said coolant is a liquid which is permeable to the light radiation of the plasma discharge.

5. An apparatus for light amplification comprising a laser crystal, a vessel surrounding said crystal for holding a gas, and a high frequency coil for inducing electric currents in the gas and producing an electrodeless gas discharge, whereby the crystal is exposed to electrical pumping action by radiation from the plasma of the discharge.

6. An apparatus for light amplification comprising a laser crystal, a vessel surrounding said crystal for holding a gas and having means for isolating said gas from said crystal, and a high frequtncy coil for inducing electric currents in the gas and producing an electrodeless gas discharge, whereby the crystal is exposed to electrical pumping action by radiation from the plasma of the discharge.

7. An apparatus for light amplification comprising a laser crystal, a vessel surrounding said crystal for holding a gas and having means for isolating said gas from said crystal, means for moving said gas past the region of said crystal, and a high frequency coil for inducing electric currents in the gas and producing an electrodeless gas discharge, whereby the crystal is exposed to electrical pumping action by radiation from the plasma of the discharge.

8. An apparatus for light amplification comprising a laser crystal, a vessel surrounding said crystal for holding a gas and having means for isolating said gas from said crystal, means for moving said gas past the region of said crystal, means for passing a coolant between said crystal and said vessel, and a high frequency coil for inducing electric currents in the gas and producing an electrodeless gas discharge, whereby the crystal is exposed to electrical pumping action by radiation from the plasma of the discharge.

9. An apparatus for light amplification comprising a laser crystal, a vessel surrounding said crystal for holding a gas and having means for isolating said gas from said crystal, means for moving said gas past the region of said crystal, a high frequency coil for inducing electric currents in the gas and producing an electrodeless gas discharge, and means for passing a coolant which is permeable to the light radiation of the plasma discharge between said crystal and said vessel, whereby the crystal is exposed to electrical pumping action by radiation from the plasma of the discharge.

References Cited by the Examiner

Burkhardt et al.: "Pinch Effect," J. Applied Physics, May, 1957, vol. 28, No. 5, pages 519 to 521.

Colgate et al.: "Dynamic Pinch Effect as a High-Intensity Light Source for Optical Maser Pumping," Document Number UCRL–6364, Apr. 6, 1961.

Vogel et al.: "Lasers: Devices and Systems—Part I," Electronics, vol. 34, No. 34, Oct. 27, 1961, pages 44 and 45 (see also Nuclear Science Abstracts, vol. 15, abstract number 16558, June 30, 1961 UCRL–6364 report available to the public May 22, 1961).

JEWELL H. PEDERSEN, *Primary Examiner.*

R. L. WIBERT, J. L. CHASKIN, *Assistant Examiners.*